(12) United States Patent
Mitsui et al.

(10) Patent No.: US 10,327,181 B2
(45) Date of Patent: Jun. 18, 2019

(54) COMMUNICATION CONTROL METHOD, BASE STATION, AND USER TERMINAL

(71) Applicant: KYOCERA CORPORATION, Kyoto (JP)

(72) Inventors: Katsuhiro Mitsui, Ritto (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/576,772

(22) PCT Filed: May 25, 2016

(86) PCT No.: PCT/JP2016/065461
§ 371 (c)(1),
(2) Date: Nov. 24, 2017

(87) PCT Pub. No.: WO2016/190357
PCT Pub. Date: Dec. 1, 2016

(65) Prior Publication Data
US 2018/0302827 A1    Oct. 18, 2018

(30) Foreign Application Priority Data
May 28, 2015 (JP) .................................. 2015-108881

(51) Int. Cl.
*H04W 36/08* (2009.01)
*H04W 16/32* (2009.01)
(Continued)

(52) U.S. Cl.
CPC ....... *H04W 36/0061* (2013.01); *H04W 76/15* (2018.02); *H04W 16/32* (2013.01);
(Continued)

(58) Field of Classification Search
CPC .. H04W 36/0061; H04W 36/04; H04W 76/15
See application file for complete search history.

(56) References Cited

U.S. PATENT DOCUMENTS

2011/0201339 A1    8/2011  Kuningas
2013/0127474 A1*   5/2013  Zhang ............... H04W 52/0206
                                                      324/433
(Continued)

FOREIGN PATENT DOCUMENTS

JP      2012-507921 A      3/2012
WO   WO-2013065841 A1 *   5/2013  ............ H04W 16/16
(Continued)

OTHER PUBLICATIONS

International Search Report issued in PCT/JP2016/065461; dated Aug. 23, 2016.
(Continued)

*Primary Examiner* — Scott M Sciacca
(74) *Attorney, Agent, or Firm* — Studebaker & Brackett PC (57) ABSTRACT

A communication control method according to one embodiment comprises transmitting, by a first base station configured to manage a cell, a message to a second base station in a specific procedure; and storing, by the second base station that receives the message, information included in the message by associating with the cell. The information includes at least one of information related to a cell size of the cell and information related to a capability of the cell for dual connectivity communication.

4 Claims, 9 Drawing Sheets

(51) Int. Cl.
H04W 36/00 (2009.01)
H04W 76/15 (2018.01)
H04W 36/04 (2009.01)
H04W 92/20 (2009.01)

(52) U.S. Cl.
CPC .... H04W 36/0069 (2018.08); H04W 36/0085 (2018.08); H04W 36/04 (2013.01); H04W 36/08 (2013.01); H04W 92/20 (2013.01)

(56) References Cited

U.S. PATENT DOCUMENTS

| | | | |
|---|---|---|---|
| 2014/0307687 A1* | 10/2014 | Fujishiro | H04W 16/16 370/329 |
| 2016/0014661 A1* | 1/2016 | Choi | H04W 52/0206 370/311 |
| 2016/0127961 A1* | 5/2016 | Wang | H04W 36/0061 370/331 |
| 2016/0286449 A1* | 9/2016 | Choi | H04W 36/28 |

FOREIGN PATENT DOCUMENTS

| | | | | |
|---|---|---|---|---|
| WO | WO-2014142491 A1 | * | 9/2014 | ........ H04W 52/0206 |
| WO | WO-2014205711 A1 | * | 12/2014 | ........ H04W 36/0061 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300 V12.5.0; Mar. 2015; pp. 1-251; Release 12; 3GPP Organizational Partners.

3rd Generation Partnership Project; Technical Specification Group Radio Access Network; Evolved Universal Terrestrial Radio Access Network (E-UTRAN); Extension of Dual Connectivity in EUTRAN; 3GPP TR 36.875 V1.0.0; Mar. 2015; pp. 1-18; Release 13; 3GPP Organizational Partners.

* cited by examiner

COMMUNICATION CONTROL METHOD, BASE STATION, AND USER TERMINAL

TECHNICAL FIELD

The present application relates to a communication control method, a base station, and a user terminal in a mobile communication system.

BACKGROUND ART

In 3GPP (3rd Generation Partnership Project) which is a project aiming to standardize a mobile communication system, dual connectivity communication has been specified (for example, see Non Patent Document 1). The dual connectivity communication is a communication mode in which a master cell group (MCG) and a secondary cell group (SCG) are set to a user terminal in an RRC (Radio Resource Control) connected mode. The MCG is a serving cell group managed by a maser base station. The SCG is a serving cell group managed by a secondary base station.

PRIOR ART DOCUMENT

Non-Patent Document

Non Patent Document 1; 3GPP Technical Specification "TS 36.300 V12.5.0" March, 2015

SUMMARY

A communication control method according to one embodiment comprises transmitting, by a first base station configured to manage a cell, a message to a second base station in a specific procedure; and storing, by the second base station that receives the message, information included in the message by associating with the cell. The information includes at least one of information related to a cell size of the cell and information related to a capability of the cell for dual connectivity communication.

DESCRIPTION OF THE EMBODIMENT

Overview of Embodiment

In dual connectivity communication, a maser base station establishes an RRC connection with a user terminal and performs mobility control (in particular, handover control) of the user terminal. On the other hand, a secondary base station provides an additional radio resource to the user terminal without establishing an RRC connection with the user terminal.

Therefore, to suppress a handover frequency of the user terminal, it is desirable to set, as the maser base station, a base station having a wide coverage (for example, a macro cell base station).

Furthermore, to guarantee continuity in the dual connectivity communication during handover, it is desirable that a target base station (target cell) has a capability for the dual connectivity communication.

In the embodiments below, a communication control method is disclosed by which appropriate mobility control can be performed when performing the dual connectivity communication.

A communication control method according to first to fourth embodiments comprises transmitting, by a first base station configured to manage a cell, a message to a second base station in a specific procedure; and storing, by the second base station that receives the message, information included in the message by associating with the cell. The information includes at least one of information related to a cell size of the cell and information related to a capability of the cell for dual connectivity communication.

In the first embodiment, the specific procedure is a procedure different from a handover procedure.

In an operation pattern 1 of the first embodiment, the specific procedure is an inter-base-station interface setup procedure.

In an operation pattern 2 of the first embodiment, the specific procedure is a base station configuration update procedure.

In the first embodiment, the second base station determines, based on the information included in the message, a target base station to which a user terminal connected to a cell managed by the second base station is handed over.

In the first embodiment, the information related to the cell size of the cell includes at least one of the cell size of the cell, transmission power of the cell, and information indicating a possibility of the size of the cell being modified.

A base station according to the first embodiment manages a cell. The base station comprises a controller configured to perform a process of transmitting a message to another base station in a specific procedure. The message includes at least one of information related to a cell size of the cell and information related to a capability of the cell for dual connectivity communication.

A communication control method according to a second embodiment comprises: in a handover procedure where a user terminal is handed over from a source base station to a target base station, transmitting, by the target base station configured to manage a target cell, a handover acknowledgement message indicating an acknowledgement of a request for the handover, to the source base station; and determining, by the source base station, based on information included in the handover acknowledgement message, whether or not to continue the handover procedure. The handover acknowledgement message includes at least one of information related to a cell size of the target cell and information related to a capability of the target cell for dual connectivity communication.

A base station according to the second embodiment manages a cell in a handover procedure where a user terminal is handed over from another base station to the base station. The base station comprises a controller configured to perform a process of transmitting, to the other base station, a handover acknowledgement message indicating an acknowledgement of a request for the handover. The handover acknowledgement message includes at least one of information related to a cell size of the cell and information related to a capability of the cell for dual connectivity communication.

In the second embodiment, at least one of the information related to the cell size of the cell and the information related to the capability of the cell for the dual connectivity communication is used by the other base station to determine whether or not to continue the handover procedure.

A communication control method according to a third embodiment comprises: in a handover procedure where a user terminal is handed over from a source base station to a target base station, transmitting, by the source base station, a handover request message indicating a request for the handover, to the target base station configured to manage a target cell; and determining, by the target base station, based on information included in the handover request message, whether or not to acknowledge the request for the handover. The information includes at least one of information related to a cell size required for the target cell and information related to a capability for dual connectivity communication required for the target cell.

In the third embodiment, the target base station, if acknowledging the request for the handover, transmits a handover acknowledgement message indicating an acknowledgement of the request for the handover, to the source base station, and if rejecting the request for the handover, transmits a handover rejection message indicating a rejection of the request for the handover, to the source base station.

A base station according to the third embodiment manages a cell in a handover procedure where a user terminal is handed over from the base station to another base station. The base station comprises a controller configured to perform a process of transmitting, to the other base station configured to manage another cell, a handover request message indicating a request for the handover. The handover request message includes at least one of information related to a cell size required for the other cell and information related to a capability for dual connectivity communication required for the other cell.

A communication control method according to a fourth embodiment comprises: transmitting, by a user terminal, based on a radio signal received from a neighbouring cell, a measurement report to a serving cell to which the user terminal is connected; and storing, by a base station configured to manage the serving cell, information included in the measurement report by associating with the neighbouring cell. The information includes at least one of information related to a cell size of the neighbouring cell and information related to a capability of the neighbouring cell for dual connectivity communication.

A user terminal according to the fourth embodiment comprises
a receiver configured to receive a radio signal from a neighbouring cell; and a controller configured to perform a process of transmitting a measurement report to a serving cell, based on the radio signal. The radio signal includes at least one of information related to a cell size of the neighbouring cell and information related to a capability of the neighbouring cell for dual connectivity communication. The controller is configured to include, into the measurement report, at least one of the information related to the cell size of the neighbouring cell and the information related to the capability of the neighbouring cell for the dual connectivity communication included in the radio signal.

[Mobile Communication System]
(1) Configuration of System

Figure 1:
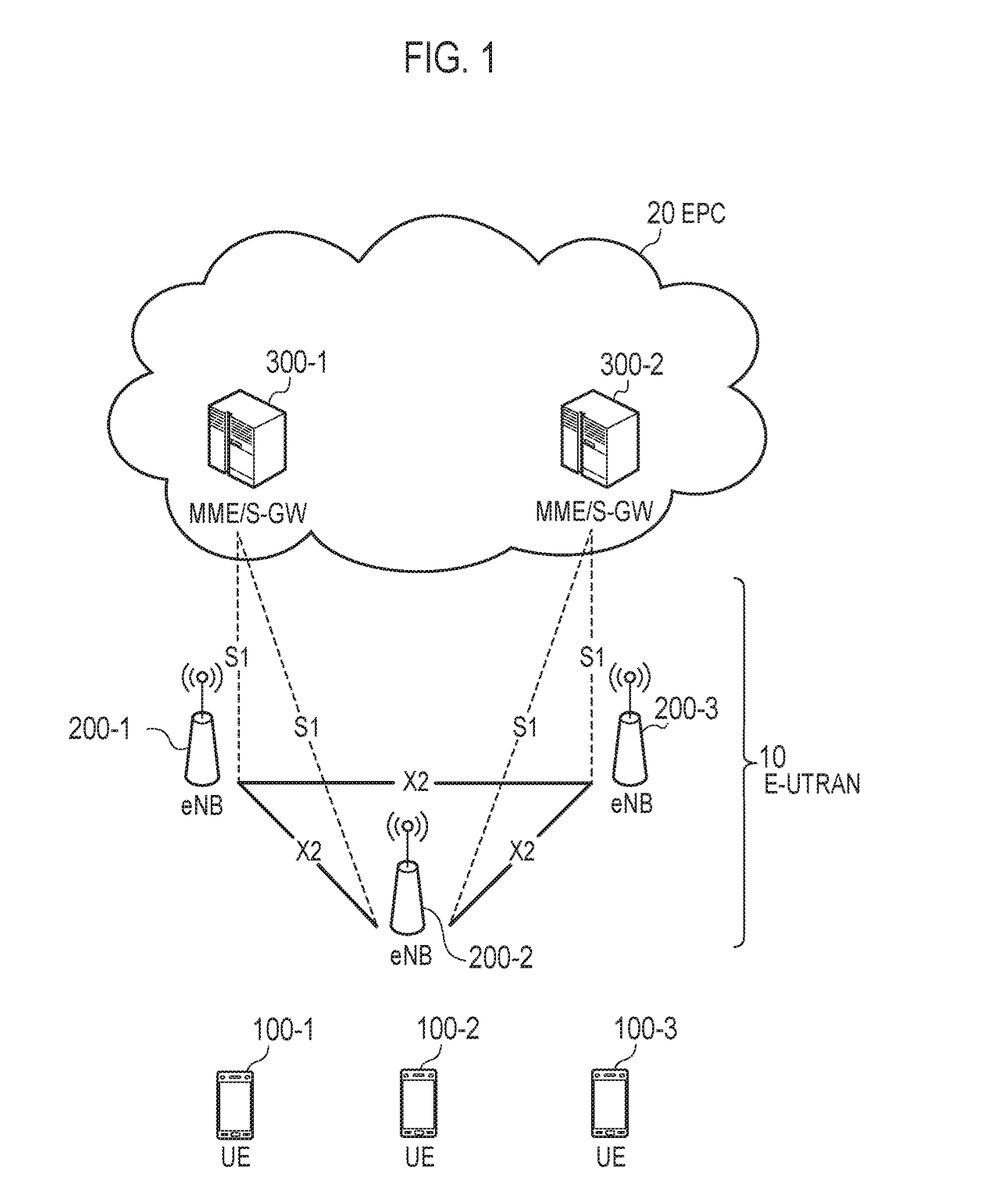
FIG. 1 is a diagram illustrating a configuration of an LTE system.

FIG. 1 is a diagram illustrating a configuration of a LTE (Long Term Evolution) system that is a mobile communication system according to the embodiments. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. The X2 interface corresponds to an inter-base-station interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME corresponds to a mobility management apparatus and performs various mobility controls and the like for the UE 100. The S-GW performs control to transfer data. MME/S-GW 300 is connected to eNB 200 via an S1 interface. The E-UTRAN 10 and the EPC 20 constitute a network.

(2) Configuration of Radio Interface

Figure 2:
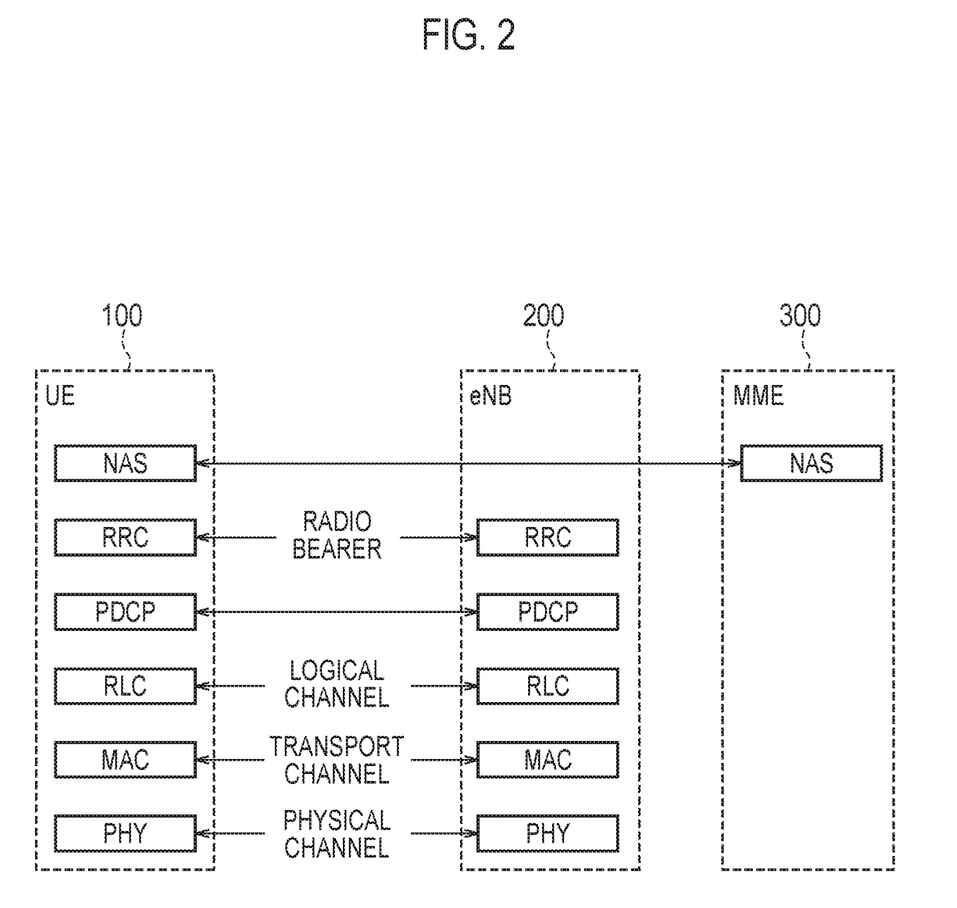
FIG. 2 is a protocol stack diagram of a radio interface in the LTE system.

FIG. 2 is a protocol stack diagram of a radio interface in the LTE system. As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode, otherwise the UE 100 is in an RRC idle mode.

A NAS (Non-Access Stratum) layer positioned above the RRC layer performs a session management, a mobility management and the like.

(3) Configuration of User Terminal

Figure 3:
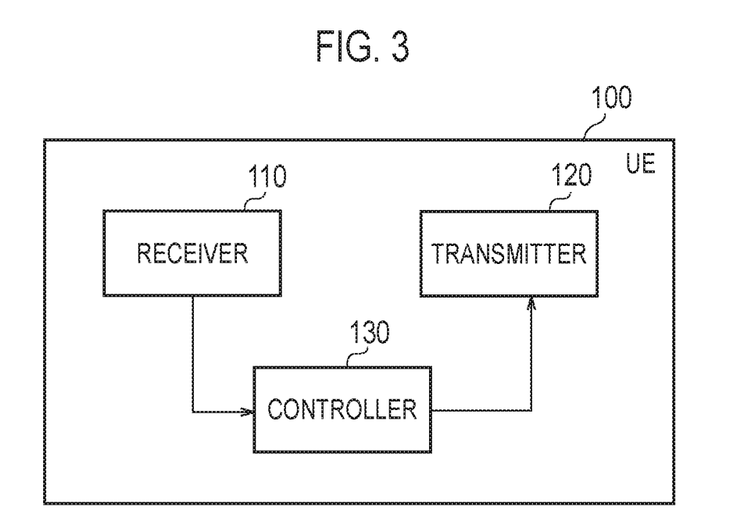
FIG. 3 is a block diagram of a UE (user terminal).

FIG. 3 is a block diagram of a configuration of the UE 100 (user terminal). As illustrated in FIG. 3, the UE 100 includes a receiver 110, a transmitter 120, and a controller 130.

The receiver 110 performs various types of reception under the control of the controller 130. The receiver 110 includes an antenna and a receiving machine. The receiving machine converts a radio signal received by the antenna into a baseband signal (reception signal) and outputs it to the controller 130.

The transmitter 120 performs various types of transmission under the control of the controller 130. The transmitter 120 includes an antenna and a transmitting machine. The transmitting machine converts a baseband signal (transmission signal) output from the controller 130 into a radio signal and transmits it from the antenna.

The controller 130 performs various controls in the UE 100. The controller 130 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor may include a codec for encoding/decoding audio/video signals. The processor executes various processes described later and various communication protocols described above.

(4) Configuration of Base Station

Figure 4:
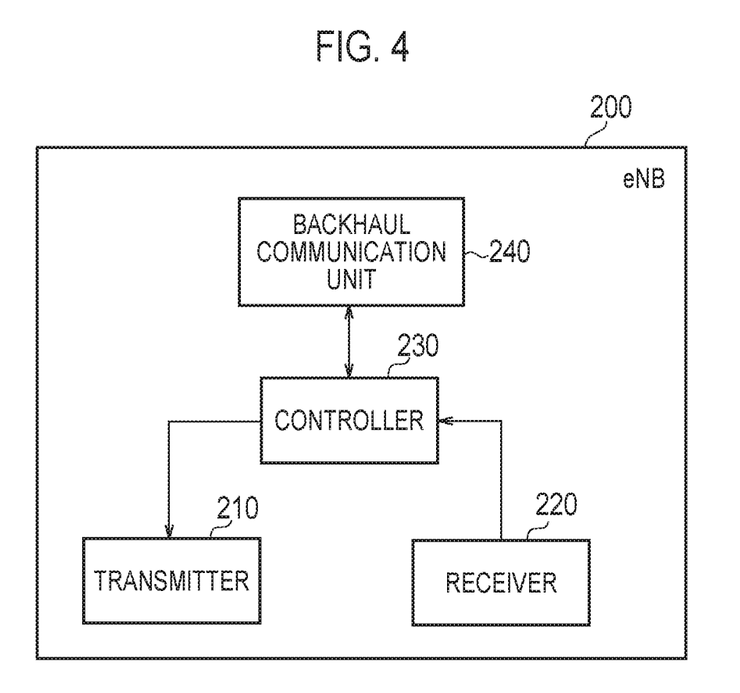
FIG. 4 is a block diagram of an eNB (base station).

FIG. 4 is a block diagram of the eNB 200. As illustrated in FIG. 4, the eNB 200 includes a transmitter 210, a receiver 220, a controller 230, and a backhaul communication unit 240.

The transmitter 210 performs various transmissions under the control of the controller 230. The transmitter 210 includes an antenna and a transmitting machine. The transmitting machine converts a baseband signal (transmission signal) output from the controller 230 into a radio signal and transmits it from the antenna.

The receiver 220 performs various types of reception under the control of the controller 230. The receiver 220 includes an antenna and a receiving machine. The receiving machine converts a radio signal received by the antenna into a baseband signal (reception signal) and outputs it to the controller 230.

The controller 230 performs various controls in the eNB 200. The controller 230 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor executes various processes described later and various communication protocols described above.

The backhaul communication unit 240 is connected to an adjacent eNB 200 via the X2 interface, and is connected to the MME/S-GW 300 via an S1 interface. The backhaul communication unit 240 is used for communication performed on the X2 interface, communication performed on the S1 interface, and the like.

(5) Overview of Dual Connectivity Communication

The dual connectivity communication is a communication mode in which a master cell group (MCG) and a secondary cell group (SCG) are set to the UE 100 in the RRC connected mode. The MCG is a serving cell group managed by a master base station (MeNB). The SCG is a serving cell group managed by a secondary base station (SeNB). The UE 100 is allocated, from each eNB 200, with a radio resource, and thus, it is possible to expect an improvement in throughput.

In the dual connectivity communication, of a plurality of eNBs 200 that establish connection with the UE 100, only the MeNB establishes an RRC connection with the UE 100. On the other hand, the SeNB provides an additional radio resource to the UE 100 without establishing an RRC connection with the UE 100. An X2 interface is present between the MeNB and the SeNB.

In a scheme of transferring user data in the dual connectivity communication, a total of three types of bearers, that is, an MCG bearer, an SCG bearer, and a split bearer, are defined. The MCG bearer is a bearer in which a corresponding radio protocol is present only in the MeNB and which uses only a resource of the MeNB. The SCG bearer is a bearer in which a corresponding radio protocol is present only in the SeNB and which uses only a resource of the SeNB. The split bearer is a bearer in which a corresponding radio protocol is present in both the MeNB and the SeNB and which uses resources of both the MeNB and the SeNB.

First Embodiment (1) Assumed Scenario

Figures 5A, 5B:
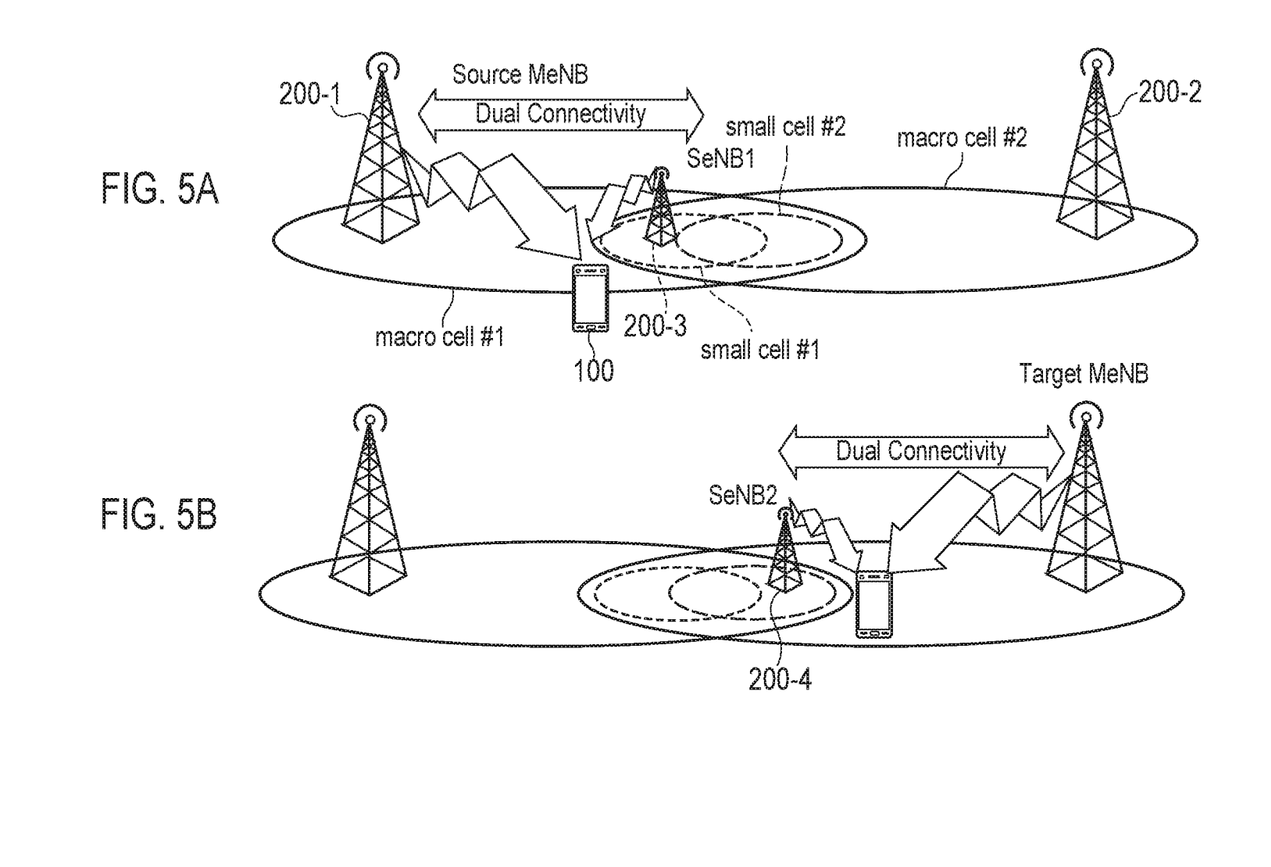
FIG. 5 is a diagram illustrating an assumed scenario according to an embodiment.

FIG. 5 is a diagram illustrating an assumed scenario according to a first embodiment.

As illustrated in FIG. 5, an eNB 200-1 manages a macro cell #1, an eNB 200-2 manages a macro cell #2, an eNB 200-3 manages a small cell #1, and an eNB 200-4 manages a small cell #2. A part of the macro cell #1 overlaps with a part of the macro cell #2, and the small cell #1 and the small cell #2 are located within the overlapping region. A part of the small cell #1 overlaps with a part of the small cell #2.

As illustrated in FIG. 5 (a), the UE 100 located within the small cell #1 performs the dual connectivity communication by setting the eNB 200-1 as the MeNB (MCG) and setting the eNB 200-3 as the SeNB (SCO). Under such a situation, it is assumed that the UE 100 moves in a direction from the small cell #1 to the small cell #2.

In this case, a radio situation between the UE 100 and the eNB 200-1 is deteriorated, arising the need for a handover of the UE 100. The eNB 200-1 determines to perform the handover of the UE 100, based on a measurement report transmitted from the UE 100. The measurement report includes measurement result of each of a serving cell and a neighbouring cell. The measurement result is reference signal received power (RSRP) and reference signal received quality (RSRQ), for example.

Here, a handover candidate of the UE 100 includes the small cell #2 and the macro cell #2. However, if the UE 100 performs handover from the macro cell #1 to the small cell #2, the UE 100 may need to thereafter perform handover to the macro cell #2 since the coverage of the small cell #2 is small. This makes the handover to the small cell #2 inefficient.

On the other hand, as illustrated in FIG. 5 (*b*), if the UE 100 performs handover from the macro cell #1 to the macro cell #2, the above-described inefficient handover can be avoided. Noted that in FIG. 5 (*b*), an example is illustrated where the UE 100 performs the dual connectivity communication by, after the handover from the macro cell #1 to the macro cell #2, setting the eNB 200-2 as the MeNB (MCG) and setting the eNB 200-4 as the SeNB (SCO).

(2) Operation According to First Embodiment

In the above-described assumed scenario, if the eNB 200-1 recognizes a cell size of each of neighbouring cells of a cell of the eNB 200-1 (macro cell #1), the eNB 200-1 can preferentially select, as a target cell, the macro cell #2 over the small cell #2.

Furthermore, if the eNB 200-1 recognizes a capability of each of the neighbouring cells of the cell of the eNB 200-1 (macro cell #1) for the dual connectivity communication, the eNB 200-1 can preferentially select, as a target cell, a cell (eNB) having the capability for the dual connectivity communication, to maintain QoS of the UE 100.

The eNB 200 according to the first embodiment uses signaling between the eNBs to acquire beforehand information related to a cell size of the neighbouring cell and information related to the capability of the neighbouring cell for the dual connectivity communication.

In the first embodiment, an eNB 200A managing a cell A transmits a message to an eNB 200B in a specific procedure that is different from a handover procedure. Here, the eNB 200B is an eNB 200 managing a neighbouring cell of the cell A.

The message includes information related to a cell size of the cell A and/or information related to a capability of the cell A for the dual connectivity communication. Hereinafter, the information related to the cell size is referred to as "cell size related information" and the information related to the capability for the dual connectivity communication is referred to as "capability related information". In the first embodiment, an example is described where the message includes both the cell size related information and the capability related information.

The cell size related information includes an index (Cell Size) indicating the size of the cell A. The "Cell Size" includes "very small", "small", "medium", "large", etc. The size of the cell A can be modified due to energy saving (ES) and the like, as described later. Specifically, the cell size can be reduced for the purpose of the ES. Furthermore, the cell size can be expanded for the purpose of coverage compensation of other cells. Thus, it is desirable that the "Cell Size" indicates the most recent cell size (current cell size). Alternatively, the "Cell Size" may indicate a future cell size by taking into consideration a schedule for the ES and the like.

Furthermore, the cell size related information may include a transmission power value (Transmission power) of the cell A. The "Transmission power" is a transmission power value of a reference signal, for example. The "Transmission power" may be represented by "dBm" or "watt". The "Transmission power" has a large amount of information, but can indicate the cell size in more detail than the "Cell Size".

Moreover, the cell size related information may include information (ES cell indicator) indicating a possibility to modify the size of the cell A. For a cell having the possibility of the cell size being modified, the "ES cell indicator" is included in the cell size related information.

The capability related information is information directly indicating the presence or absence of the capability for the dual connectivity communication, or information indirectly indicating the presence or absence of the capability for the dual connectivity communication.

The information directly indicating the presence or absence of the capability for the dual connectivity communication is, for example, a flag: "1" is indicated if the cell A has the capability for the dual connectivity communication; and "0" is indicated if the cell A does not have the capability for the dual connectivity communication.

The information indirectly indicating the presence or absence of the capability for the dual connectivity communication is, for example, a release number supported by the cell A. If the cell supports Release 12 or Release thereafter, it can be considered that the cell has the capability for the dual connectivity communication. Noted that if the capability related information is not included, the cell can be considered as a cell supporting Release 8.

The eNB 200B that receives a message from the eNB 200A stores information included in the message by associating with the cell A. For example, the eNB 200B stores and manages information related to the cell A as a part of a neighbouring cell table (NRT: Neighbour Relation Table).

An example of the NRT according to the first embodiment is shown in Table 1.

TABLE 1

| NR | TCI | cell size related information | capability related information |
|----|-----|-------------------------------|-------------------------------|
| 1  | TCI#1 | Aaa | ddd |
| 2  | TCI#2 | Bbb | eee |
| 3  | TCI#3 | Ccc | fff |

As shown in Table 1, the NRT according to the first embodiment has, for each neighbouring cell (NR), a TCI (Target Cell Identifier), the cell size related information, and the capability related information. The TCI is, for example, an ECGI (E-UTAN Cell Global Identifier) and a PCI (Physical Cell Identifier) of a corresponding neighbouring cell.

At the time of handover of the UE 100 performing the dual connectivity communication, the eNB 200B determines a target cell of the UE 100, based on the cell size related information and the capability related information included in the NRT. Alternatively, even if the UE 100 does not perform the dual connectivity communication, but if the UE 100 has a function of the dual connectivity communication, the eNB 200B may determine the target cell of the UE 100, based on the cell size related information and the capability related information included in the NRT.

Firstly, the eNB 200B preferentially determines, based on the cell size related information included in the NRT, a cell having a big cell size (for example, a macro cell) as the target cell. For example, the eNB 200B preferentially determines a cell having a big cell size as the target cell by adjusting a threshold value to be compared with measurement result included in the measurement report. If a plurality of macro cells are included in the handover candidate, the eNB 200B preferably determines, based on the "ES cell indicator", a macro cell having no possibility of cell size reduction from among the plurality of macro cells, as the target cell.

The eNB 200B may take into consideration the movement speed of the UE 100 to determine the target cell. For example, for the UE 100 with low movement speed, the eNB 200B is allowed to determine a cell other than the macro cell (pico cell, etc.) as the target cell.

Secondly, the eNB 200B preferentially determines, based on the capability related information included in the NRT, a cell having the capability for the dual connectivity communication, as the target cell.

(2.1) Operation Pattern 1 According to First Embodiment

In an operation pattern 1 according to the first embodiment, the eNB 200A transmits a message as above to the eNB 200B in an X2 setup procedure. The "X2 setup" procedure is a procedure for exchanging a configuration in an application level required for two eNBs interconnected via the X2 interface.

Figure 6:
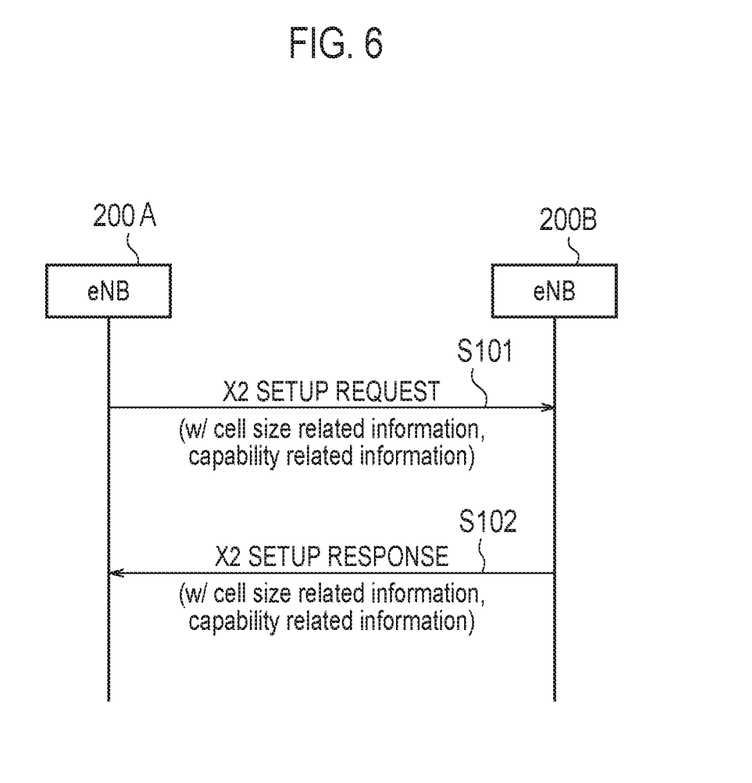
FIG. 6 is a diagram illustrating an example of an operation pattern 1 according to a first embodiment.

FIG. 6 is a diagram illustrating an example of the operation pattern 1 according to the first embodiment.

As illustrated in FIG. 6, in step S101, the eNB 200A transmits an "X2 SETUP REQUEST" message to the eNB 200B. The "X2 SETUP REQUEST" message includes information (Served Cell information) related to each cell managed by the eNB 200A. The "Served Cell information" includes cell identification information (ECGI, PCI) of the corresponding cell, the cell size related information of the corresponding cell, and the capability related information of the corresponding cell. However, if assumed that the cell size and the capability are common to each cell managed by the eNB 200A, the "X2 SETUP REQUEST" message may include one item of cell size related information and one item of capability related information associated with identification information (Global eNB ID) of the eNB 200A. In this case, one item of cell size related information and one item of capability related information are commonly applied to each cell managed by the eNB 200A.

The eNB 200B that receives the "X2 SETUP REQUEST" message stores information included in the "X2 SETUP REQUEST" message, and creates and manages an NRT as shown in Table 1.

In step S102, the eNB 200B transmits an "X2 SETUP RESPONSE" message to the eNB 200A. The "X2 SETUP RESPONSE" message includes information (Served Cell information) related to each cell managed by the eNB 200B. The "Served Cell information" includes cell identification information (ECGI, PCI) of the corresponding cell, the cell size related information of the corresponding cell, and the capability related information of the corresponding cell. However, the "X2 SETUP RESPONSE" message may include one item of cell size related information and one item of capability related information associated with identification information (Global eNB ID) of the eNB 200.

The eNB 200A that receives the "X2 SETUP RESPONSE" message stores information included in the "X2 SETUP RESPONSE" message, and creates and manages an NRT as shown in Table 1.

Noted that based on the cell size related information, etc. included in the "X2 SETUP REQUEST" message, the eNB 200B may transmit the "X2 SETUP RESPONSE" message if acknowledging the "X2 SETUP", and may transmit an "X2 SETUP FAILURE" message if not acknowledging the "X2 SETUP".

(2.2) Operation Pattern 2 According to First Embodiment

In an operation pattern 2 according to the first embodiment, the eNB 200A transmits a message as above to the eNB 200B in a base station configuration update (ENB CONFIGURATION UPDATE) procedure. The "ENB CONFIGURATION UPDATE" procedure is a procedure for updating a configuration in an application level required for two eNBs interconnected via the X2 interface. The operation pattern 2 may be applied together with the operation pattern 1.

Figure 7:
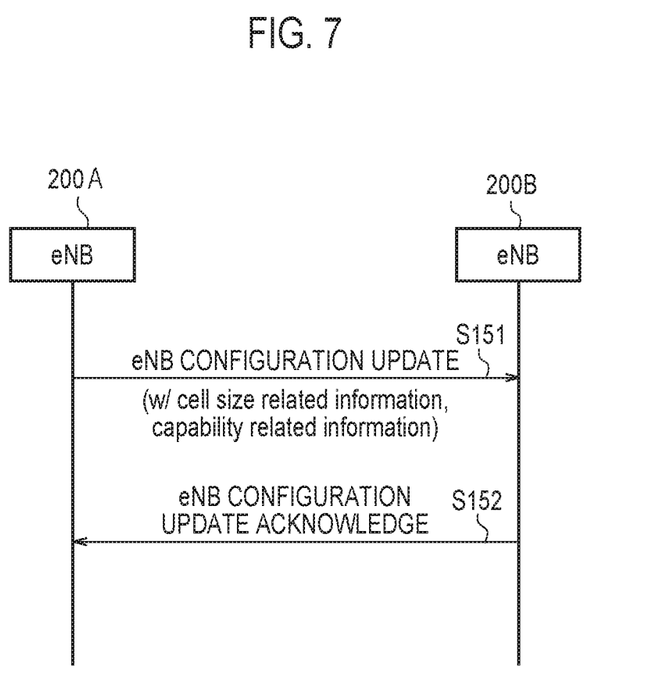
FIG. 7 is a diagram illustrating an example of an operation pattern 2 according to the first embodiment.

FIG. 7 is a diagram illustrating an example of the operation pattern 2 according to the first embodiment.

As illustrated in FIG. 7, in step S151, the eNB 200A transmits an "ENB CONFIGURATION UPDATE" message to the eNB 200B. The "ENB CONFIGURATION UPDATE" message includes update information of a cell to be added (Served Cells To Add), update information of a cell to be modified (Served Cells To Modify), or update information of a cell to be deleted (Served Cells To Delete) in the eNB 200A. The above update information includes information (Served Cell information) related to a corresponding cell. The "Served Cell information" includes cell identification information (ECGI, PCI) of the corresponding cell, the cell size related information of the corresponding cell, and the capability related information of the corresponding cell. However, the "ENB CONFIGURATION UPDATE" message may include one item of cell size related information and one item of capability related information associated with the identification information (Global eNB ID) of the eNB 200A.

The eNB 200B that receives the "ENB CONFIGURATION UPDATE" message stores information included in the "ENB CONFIGURATION UPDATE" message, and updates and manages an NRT as shown in Table 1.

In step S152, the eNB 200B transmits an "ENB CONFIGURATION UPDATE ACKNOWLEDGE" message to the eNB 200A. The eNB 200A receives the "ENB CONFIGURATION UPDATE ACKNOWLEDGE" message.

Second Embodiment

A second embodiment will be described with a particular focus on a difference from the first embodiment.

In the first embodiment, the cell size related information and the capability related information are transmitted and received between the eNBs in a procedure different from the handover procedure. On the other hand, in the second embodiment, the cell size related information and the capability related information are transmitted and received between the eNBs in the handover procedure.

In the second embodiment, a target eNB managing the target cell transmits a handover acknowledgement message to a source eNB. The handover acknowledgement message includes information related to the cell size of the target cell (cell size related information) and/or information related to the capability of the target cell for the dual connectivity communication (capability related information). The source eNB that receives the handover acknowledgement message determines, based on information included in the handover acknowledgement message, whether or not to continue the handover procedure.

Figure 8:
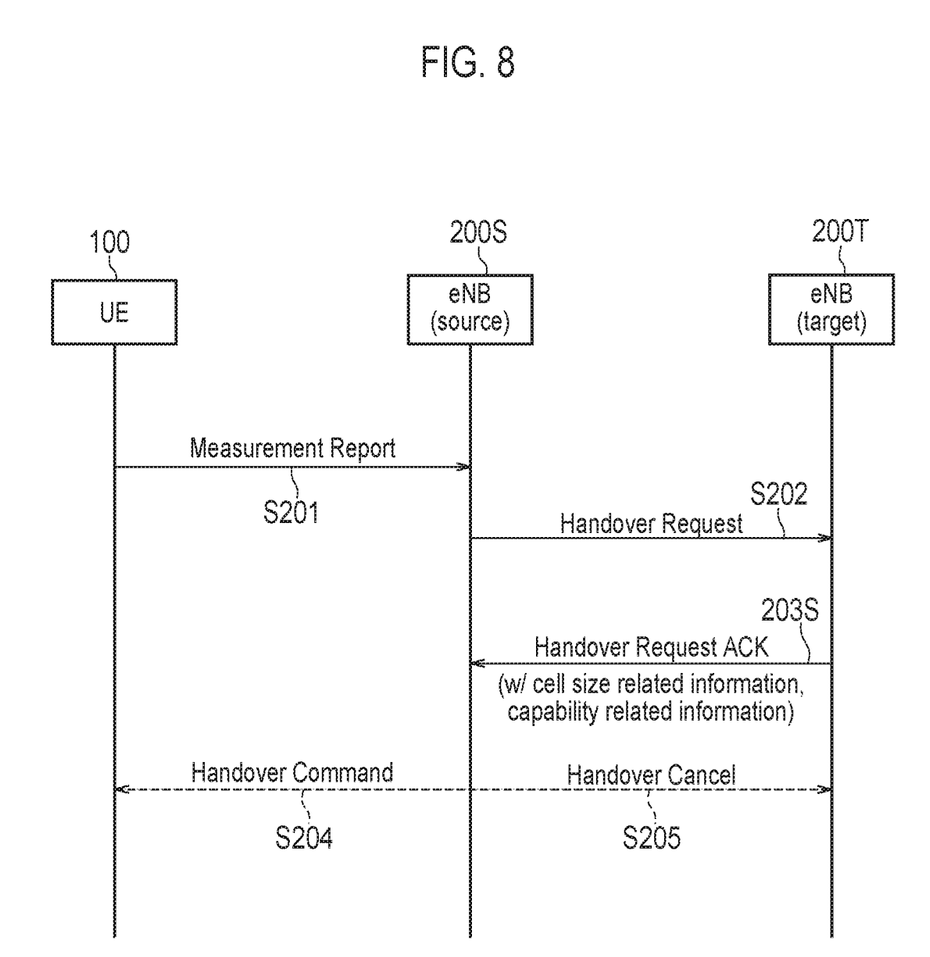
FIG. 8 is a diagram illustrating an example of an operation according to a second embodiment.

FIG. 8 is a diagram illustrating an example of an operation according to the second embodiment. It is assumed that in an initial state in FIG. 8, the UE 100 sets an eNB 200S (source base station) as the MeNB to perform the dual connectivity communication.

As illustrated in FIG. 8, in step S201, the UE 100 transmits a measurement report (Measurement Report) to the eNB 200S. The "Measurement Report" includes measurement result of each of the serving cell and the neighbouring cell. Here, it is assumed that the "Measurement Report" includes measurement result of the cell A managed by the eNB 200S and measurement result of a cell B managed by an eNB 200T. The eNB 200S determines the cell B as the target cell, based on the "Measurement Report".

In step S202, the eNB 200S transmits a handover request (Handover Request) message to the eNB 200T. The "Handover Request" message includes identification information of the target cell (Target Cell ID). The eNB 200T determines whether or not to acknowledge the "Handover Request" message. Here, description proceeds with an assumption that the eNB 200T acknowledges the request for handover indicated in the "Handover Request" message.

In step S203, the eNB 200T transmits a handover acknowledgement (Handover Request ACK) message to the eNB 200S. The "Handover Request ACK" message includes the cell size related information of the target cell or the capability related information of the target cell. In the second embodiment, an example is described where the "Handover Request ACK" message includes both the cell size related information and the capability related information.

At the time of handover of the UE 100 performing the dual connectivity communication, the eNB 200S determines, based on the cell size related information and the capability related information included in the "Handover Request ACK" message, whether or not to continue the handover procedure to the eNB 200T. Alternatively, even if the UE 100 does not perform the dual connectivity communication, but if the UE 100 has the function of the dual connectivity communication, the eNB 200S may determine, based on the cell size related information and/or the capability related information included in the "Handover Request ACK" message, whether or not to continue the handover procedure to the eNB 200T.

Furthermore, the eNB 200S may perform in parallel the handover procedure for a plurality of eNBs. Then, if the "Handover Request ACK" message is received from the plurality of eNBs, the eNB 200S may select a final target eNB from among the plurality of eNBs for which the handover procedure is continued, and may determine to cancel the handover procedure with an eNB other than the selected target eNB.

Firstly, based on the cell size related information, the eNB 200S preferentially continues the handover procedure with a cell having a big cell size (for example, a macro cell) from among the plurality of eNBs (cells). If a plurality of macro cells are included in the handover candidate, the eNB 200S preferably continues, based on the "ES cell indicator", the handover procedure with a macro cell having no possibility of cell size reduction from among the plurality of macro cells. The eNB 200S may take into consideration the movement speed of the UE 100 to determine the target cell. For example, for the UE 100 with low movement speed, the eNB 200S is allowed to determine a cell other than the macro cell (pico cell, etc.) as the target cell. Noted that if one pico cell is selected as a target from among a plurality of pico cells, a pico cell including the "ES cell indicator" (that is, a pico cell whose cell size may be expanded) may be preferentially selected. Secondly, based on the capability related information, the eNB 200S preferentially continues the handover procedure with a cell having the capability for the dual connectivity communication.

If determining to continue the handover procedure with the eNB 200T, the eNB 200S transmits, to the UE 100, a "Handover Command" instructing the handover to the eNB 200T (target cell) (step S204). In response to the reception of the "Handover Command", the UE 100 performs the handover to the eNB 200T (target cell).

On the other hand, if determining to cancel the handover procedure with the eNB 200T, the eNB 200S transmits, to the eNB 200T, a "Handover Cancel" message indicating the cancellation of the ongoing handover procedure (step S205). As a result, the handover procedure is canceled.

Noted that based on the cell size related information and the capability related information included in the "Handover Request ACK" message, the eNB 200S may partially update or newly add an NRT as shown in Table 1. As a result, the eNB 200S can appropriately perform next handover determination, based on the NRT. When partially updating or newly adding such an NRT, the X2 setup procedure and the eNB configuration update procedure in the first embodiment may or may not be additionally performed.

Third Embodiment

A third embodiment will be described with a particular focus on a difference from the first embodiment and the second embodiment. The third embodiment and the second embodiment are in common in that the cell size related information and the capability related information are transmitted and received between the eNBs in the handover procedure. However, the cell size related information and the capability related information have different meaning from that in the second embodiment.

In the third embodiment, the source eNB transmits a handover request message to the target eNB managing a target cell. The handover request message includes information related to the cell size required for the target cell (cell size related information) and/or information related to the capability for the dual connectivity communication required for the target cell (capability related information). Specific examples of the cell size related information and the capability related information are similar to that in the first embodiment. The target eNB that receives the handover request message determines, based on information included in the handover request message, whether or not to acknowledge the handover request message.

Figure 9:
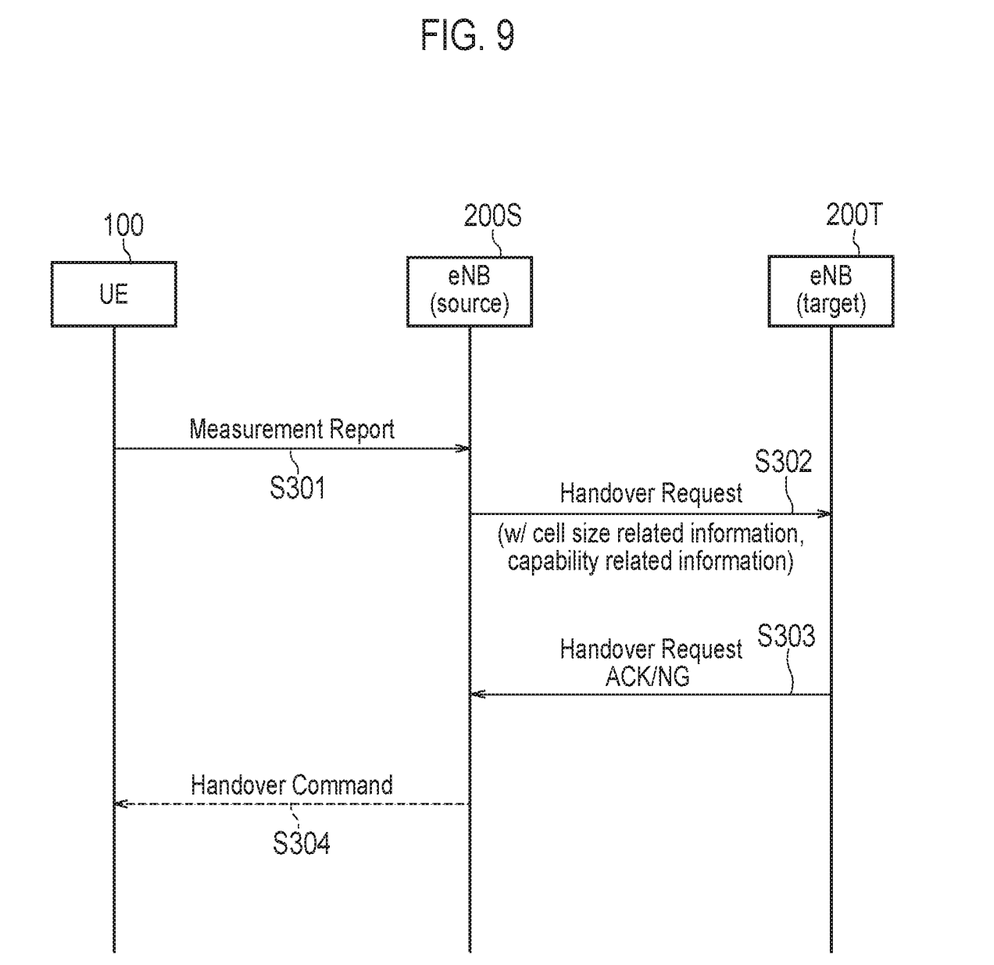
FIG. 9 is a diagram illustrating an example of an operation according to a third embodiment.

FIG. 9 is a diagram illustrating an example of an operation according to the third embodiment. It is assumed that in an initial state in FIG. 9, the UE 100 sets the eNB 200S (source base station) as the MeNB to perform the dual connectivity communication.

As illustrated in FIG. 9, in step S301, the UE 100 transmits a measurement report (Measurement Report) to the eNB 200S. Specific example of the "Measurement Report is similar to that in the second embodiment. The eNB 200S determines the cell B managed by the eNB 200T as the target cell, based on the "Measurement Report".

In step S302, the eNB 200S transmits a handover request (Handover Request) message to the eNB 200T. The "Handover Request" message includes identification information of the target cell (Target Cell ID). In the third embodiment, the "Handover Request" message includes information related to the cell size required for the target cell (cell size related information) and/or information related to the capability for the dual connectivity communication required for the target cell (capability related information). In the third embodiment, an example is described where the "Handover Request" message includes both the cell size related information and the capability related information.

Firstly, at the time of handover of the UE 100 performing the dual connectivity communication, the eNB 200S includes the cell size related information requesting a cell having a big cell size (for example, a macro cell) as a desired cell size, into the "Handover Request" message. Alternatively, even if the UE 100 does not perform the dual connectivity communication, but if the UE 100 has the function of the dual connectivity communication, the eNB 200S may include the cell size related information requesting a cell having a big cell size (for example, a macro cell) as a desired cell size, into the "Handover Request" message.

Secondly, at the time of handover of the UE 100 performing the dual connectivity communication, the eNB 200S includes the capability related information requesting a cell having the capability for the dual connectivity communication as a desired cell, into the "Handover Request" message. Alternatively, even if the UE 100 does not perform the dual connectivity communication, but if the UE 100 has the function of the dual connectivity communication, the eNB 200S may include the capability related information requesting a cell having the capability for the dual connectivity communication as a desired cell, into the "Handover Request" message.

The eNB 200T determines whether or not to acknowledge the request for handover indicated in the "Handover Request" message. In the third embodiment, the eNB 200T determines, based on the cell size related information and the capability related information included in the "Handover Request" message, whether or not the target cell satisfies the requested cell size and capability. If determining that the target cell satisfies the requested cell size and capability, the eNB 200T transmits a handover acknowledgement (Handover Request ACK) message to the eNB 200S (step S303). On the other hand, if determining that the target cell does not satisfy the requested cell size and capability, the eNB 200T transmits a message indicating that the handover request is not acceptable, to the eNB 200S (step S303). The message indicating that the handover request is not acceptable described here may be a handover rejection message (Handover Request NACK) or a handover preparation failure message (Handover Preparation Failure).

If receiving the "Handover Request ACK" message from the eNB 200T, the eNB 200S transmits, to the UE 100, a "Handover Command" instructing the handover to the eNB 200T (target cell) (step S304). In response to the reception of the "Handover Command", the UE 100 performs the handover to the eNB 200T (target cell). On the other hand, if receiving, from the eNB 200T, the message indicating that the handover request is not acceptable, the eNB 200S cancels the handover procedure with the eNB 200T (target cell).

Noted that depending on the reception situation of the "Handover Request ACK" message and the message indicating that the handover request is not acceptable (the "Handover Request NACK" message or the "Handover Preparation Failure" message), the eNB 200S may partially update or newly add an NRT as shown in Table 1. As a result, the eNB 200S can appropriately perform next handover determination, based on the NRT. When partially updating or newly adding such an NRT, the X2 setup procedure and the eNB configuration update procedure in the first embodiment may or may not be additionally performed.

Fourth Embodiment

A fourth embodiment will be described with a particular focus on a difference from the first embodiment to the third embodiment.

In the first embodiment, the cell size related information and the capability related information are directly transmitted and received between the eNBs. On the other hand, in the fourth embodiment, the cell size related information and the capability related information are indirectly transmitted and received between the eNBs via the UE 100.

In the fourth embodiment, the UE 100 transmits, based on a radio signal received from a neighbouring cell, a measurement report to a serving cell. The measurement report includes information related to the cell size of the neighbouring cell and/or information related to the capability of the neighbouring cell for the dual connectivity communication. The eNB 200 managing the serving cell stores information included in the measurement report by associating with the neighbouring cell.

Figure 10:
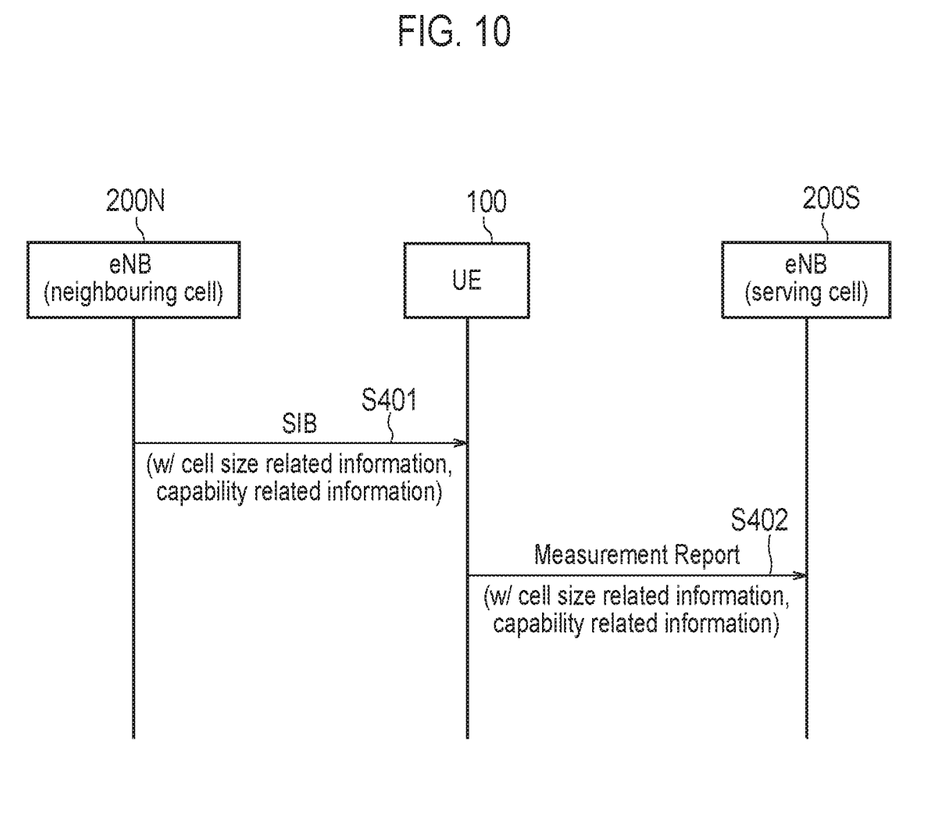
FIG. 10 is a diagram illustrating an example of an operation according to a fourth embodiment.

FIG. 10 is a diagram illustrating an example of an operation according to the fourth embodiment. In an initial state in FIG. 10, the UE 100 is in an RRC connected mode in a cell of the eNB 200S (serving cell).

As illustrated in FIG. 10, in step S401, an eNB 200N managing a neighbouring cell transmits, in the neighbouring cell, system information (SIB: System Information Block) by broadcast. In the fourth embodiment, the SIB includes cell identification information of the neighbouring cell, the cell size related information of the neighbouring cell, and the capability related information of the neighbouring cell. The UE 100 receives the SIB of the neighbouring cell. Noted that the UE 100 may receive the SIB of the neighbouring cell in response to a request from the eNB 200S (serving cell).

In step S402, the UE 100 transmits a measurement report (Measurement Report) to the eNB 200S. The "Measurement Report" includes measurement result of each of the serving cell and the neighbouring cell. In the fourth embodiment, the "Measurement Report" includes the cell size related information and/or the capability related information of the neighbouring cell.

The eNB 200S that receives the "Measurement Report" stores the cell size related information and the capability related information included in the "Measurement Report", and creates and manages an NRT as shown in Table 1. A subsequent operation is similar to that in the first embodiment.

Other Embodiments

The above-described third embodiment and fourth embodiment assume an "X2-based handover procedure" that is a handover procedure via the X2 interface. However, if the X2 interface is not established between the source eNB and the target eNB or if the "X2-based handover procedure" fails, an "S1-based handover procedure" that is a handover procedure via an S1 interface and an MME is performed. Thus, in the third embodiment and the fourth embodiment, if the handover procedure via the X2 interface cannot be performed with the target eNB, the source eNB may perform the handover procedure via the S1 and the MME (S1-based handover). In this case, the operations according to the third embodiment and the fourth embodiment may also be applied to the handover procedure via the S1 interface and the MME (S1-based handover).

In the above-described first embodiment to third embodiment, an example has been mainly described where both the cell size related information and the capability related information are transmitted and received between the eNBs. However, only either one of the cell size related information or the capability related information may be transmitted and received between the eNBs.

In the above-described fourth embodiment, an example has been mainly described where both the cell size related information and the capability related information are transmitted from the UE 100 to the eNB 200. However, only either one of the cell size related information or the capability related information may be transmitted from the UE 100 to the eNB 200.

In each embodiment described above, the LTE system has been exemplified as the mobile communication system. However, the present application is not limited to the LTE system. The present application may be applied to systems other than the LTE system.

CROSS REFERENCE

The content of Japanese Patent Application No. 2015-108881 (filed on May 28, 2015) is incorporated in the present specification by reference.

INDUSTRIAL APPLICABILITY

The present application is useful in the field of communication.

The invention claimed is:

1. A communication control method, comprising:
    transmitting, by a first base station, a handover request message for handover of a user terminal, to a second base station configured to manage a cell;
    receiving, by the first base station, a handover request acknowledge message from the second base station, the handover request acknowledge message including first information related to a cell size of the cell and second information related to a capability of the cell for dual connectivity communication; and
    determining, by the first base station, whether to handover the user terminal to the cell based on the first information and the second information.

2. The communication control method according to claim 1,
    further comprising:
    receiving, by the first base station, a measurement report from the user terminal.

3. The communication control method according to claim 1, wherein
    the first information related to the cell size of the cell includes at least one of the cell size of the cell, transmission power of the cell, and information indicating a possibility of the size of the cell being modified.

4. A base station, comprising:
    a controller configured to perform processes of:
    transmitting a handover request message for handover of a user terminal to another base station configured to manage a cell;
    receiving a handover request acknowledge message from the another base station, the handover request acknowledge message including first information related to a cell size of the cell and second information related to a capability of the cell for dual connectivity communication; and
    determining whether to handover the user terminal to the cell based on the first information and the second information.

* * * * *